(12) United States Patent
Potter

(10) Patent No.: US 6,406,240 B1
(45) Date of Patent: Jun. 18, 2002

(54) FAST ACTING NUT ASSEMBLY OR COUPLING

(76) Inventor: Richard M. Potter, 8014 Hurst Forest La., Humble, TX (US) 77346

( * ) Notice: Subject to any disclaimer, the term of this patent is extended or adjusted under 35 U.S.C. 154(b) by 0 days.

(21) Appl. No.: 09/805,718

(22) Filed: Mar. 9, 2001

Related U.S. Application Data

(60) Provisional application No. 60/188,598, filed on Mar. 9, 2000.

(51) Int. Cl.[7] ............................. F16B 37/08; F16B 39/36
(52) U.S. Cl. ......................... 411/433; 411/267; 411/270
(58) Field of Search ................................ 411/266, 267, 411/270, 433, 432

(56) References Cited

U.S. PATENT DOCUMENTS

| | | |
|---|---|---|
| 4,378,187 A | 3/1983 | Fullerton |
| 5,324,150 A | 6/1994 | Fullerton |
| 5,378,100 A | 1/1995 | Fullerton |
| 5,427,488 A | 6/1995 | Fullerton et al. |
| 5,580,200 A | 12/1996 | Fullerton |
| 5,613,816 A * | 3/1997 | Cabahug ................. 411/267 X |
| 5,733,084 A | 3/1998 | Fullerton |
| 5,788,443 A | 8/1998 | Cabahug |
| 5,800,108 A | 9/1998 | Cabahug |

FOREIGN PATENT DOCUMENTS

| | | | |
|---|---|---|---|
| CA | 968198 | * 5/1975 | ................. 411/433 |

* cited by examiner

*Primary Examiner*—Neill Wilson
(74) *Attorney, Agent, or Firm*—Browning Bushman P.C.

(57) ABSTRACT

A nut assembly (10) for engaging an externally threaded bolt (12). Nut assembly (10) includes a cylindrical casing (16) and a nut (20) secured to cylindrical casing (16) projects a substantial distance from cylindrical casing (16) to permit rotation of nut assembly (10) by a suitable conventional wrench. Three internally threaded arcuate segments (28) are mounted within cylindrical casing (16) to engage external screw threads (14) on bolt (12). Detents (40) are formed integrally with cylindrical body (16) and project radially inwardly of the inner peripheral surface (24) of cylindrical casing (16). Detents (40) fit in grooves (41) in segments (28) to connect segments (28) for rotation with cylindrical body (16) and cap (20).

13 Claims, 3 Drawing Sheets

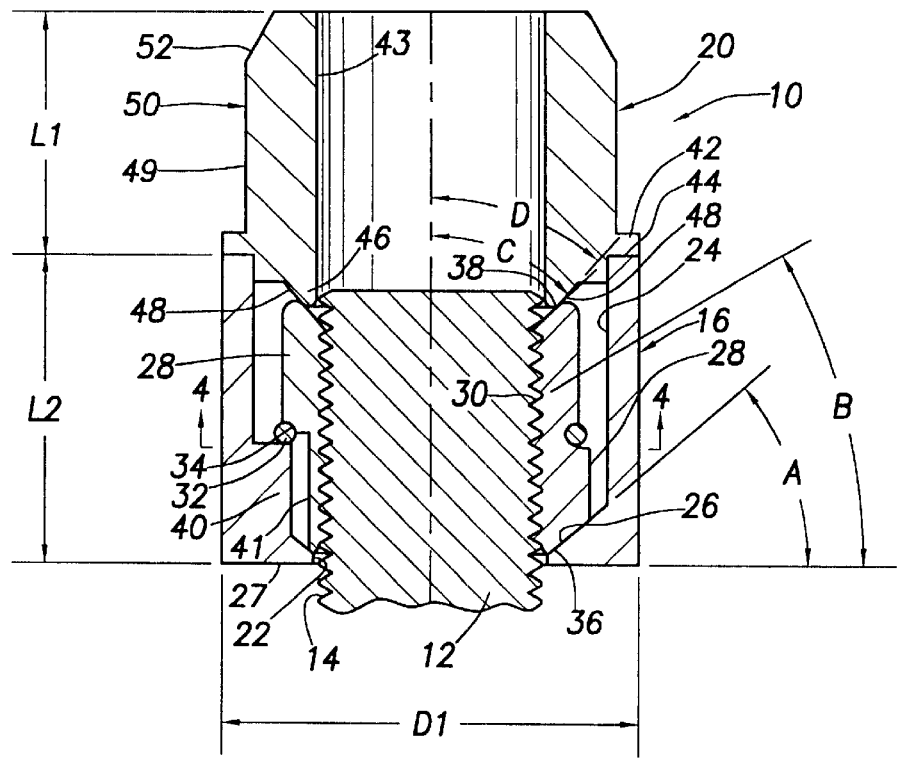
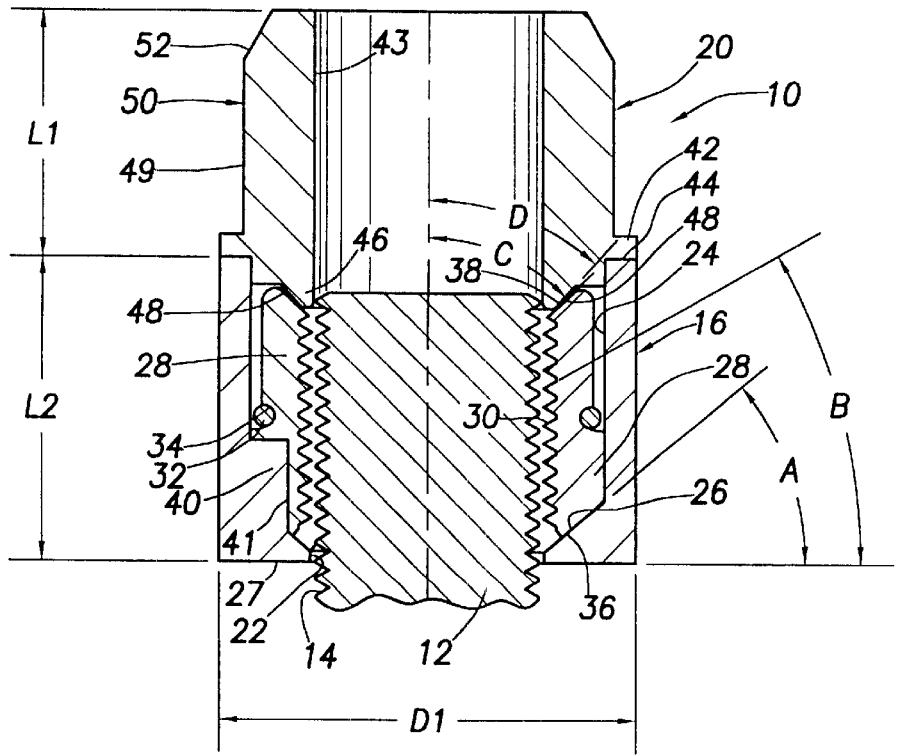

FAST ACTING NUT ASSEMBLY OR COUPLING

REFERENCE TO PROVISIONAL APPLICATION

This application claims the benefit of provisional application serial No. 60/188,598 filed Mar. 9, 2000.

FIELD OF THE INVENTION

This invention relates to a nut assembly or coupling for fitting about an externally threaded male member such as a bolt.

BACKGROUND OF THE INVENTION

Heretofore, quick acting nut or coupling assemblies have been provided in which an internally threaded nut is quickly positioned on an externally threaded bolt by pushing of the nut onto the bolt. A jam nut comprising three separate segments which may expand radially are provided. The segments have a radial spring to urge the segments radially inwardly as the segments slide along an inclined or frustoconical surface into and out of engagement with the threads on the externally threaded bolt. For example, U.S. Pat. No. 5,324,150 dated Jun. 28, 1994 shows a quick acting nut assembly in which three radially inwardly biased arcuate segments are provided to engage the threads of a bolt. The arcuate threaded segments are positioned within a hexagonal casing and inclined or frustoconical surfaces are provided between the segments and the outer casing for radial sliding movement of the segments. Separate pins are provided between the segments and casing to connect the segments to the casing for rotation with the casing. The casing has a hexagonal outer surface which is adapted to be engaged by a conventional wrench for rotation of the casing and threaded segments. Since the casing is of an outer hexagonal shape, it may not fit or be received within small diameter cylindrical openings which is required for certain uses of the nut assembly.

SUMMARY OF THE INVENTION

The present invention is particularly directed to a nut assembly or coupling for fitting about an externally threaded male member such as a bolt. The nut assembly includes an outer cylindrical casing or body having a lower inclined or frustoconical surface of a relatively large circumferential area. Three or more radially inwardly biased arcuate female segments are mounted within the casing for inward and outward radial movement along the inclined frustoconical surface of the casing. The segments have a large diameter lower end portion to provide a relatively large lower end surface for contacting the frustoconical surface of the casing. A radial spring about the segments urges the segments radially inwardly.

An outer cap has an inner end engaging the segments and an outer hexagonal surface projecting outwardly from the cylindrical body for engagement with a conventional wrench. An inwardly projecting detent on the cylindrical casing connects the segments for rotation with the cylindrical body and cap which is secured to the body. The cap projects from the cylindrical body a distance at least ⅔ of the length of the cylindrical body. By forming the body or casing of a cylindrical shape, the casing may fit in cylindrical openings as small as ⅜ inch in diameter which may be required for certain uses of the nut assembly.

It is an object of the invention to provide a nut assembly or coupling for fitting about a threaded male member such as a bolt by pushing of the nut assembly on the threaded bolt.

A further object of the invention is the provision of such a nut assembly having a cylindrical body and a cap with an outer hexagonal surface and projecting outwardly of the cylindrical body for engagement with a suitable wrench.

A further object of the invention is the provision of a nut assembly having a cylindrical body with an integral radially projecting lug or detent for engaging arcuate threaded segments for rotation of the segments with the body.

Other objects, features, and advantages of the invention will be apparent from the following specification and drawings.

BRIEF DESCRIPTION OF THE DRAWINGS

FIG. 1 is a longitudinal sectional view of a nut assembly comprising the present invention with an externally threaded bolt engaged with threaded arcuate segments;

FIG. 2 is a longitudinal sectional view similar to FIG. 1 but showing the arcuate segments disengaged from the bolt;

DESCRIPTION OF THE INVENTION

Figure 3:
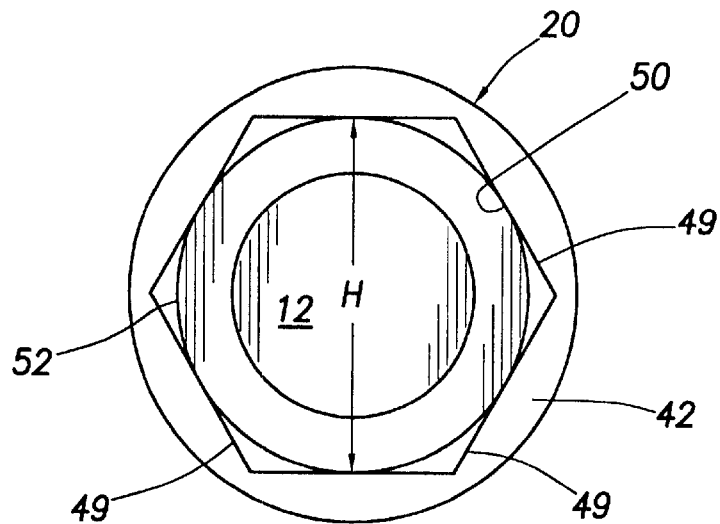
FIG. 3 is a top plan of the nut assembly shown in FIGS. 1 and 2.
Figure 4:
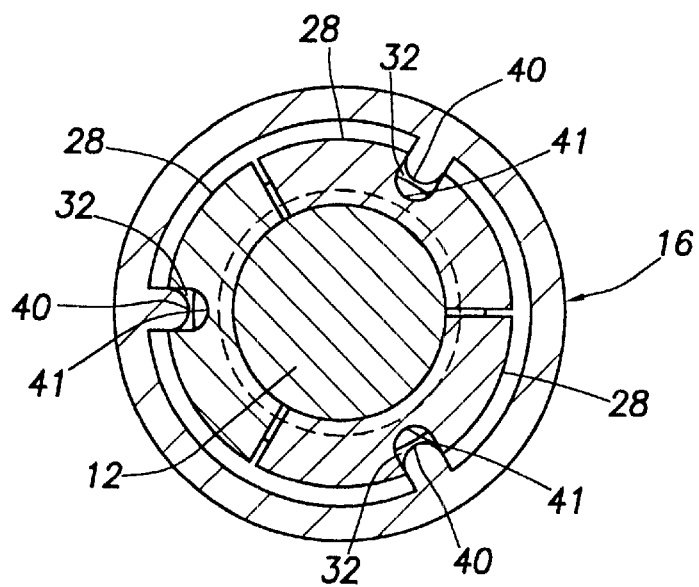
FIG. 4 is a cross sectional view taken generally along line 4—4 of FIG. 1.
Figure 5:
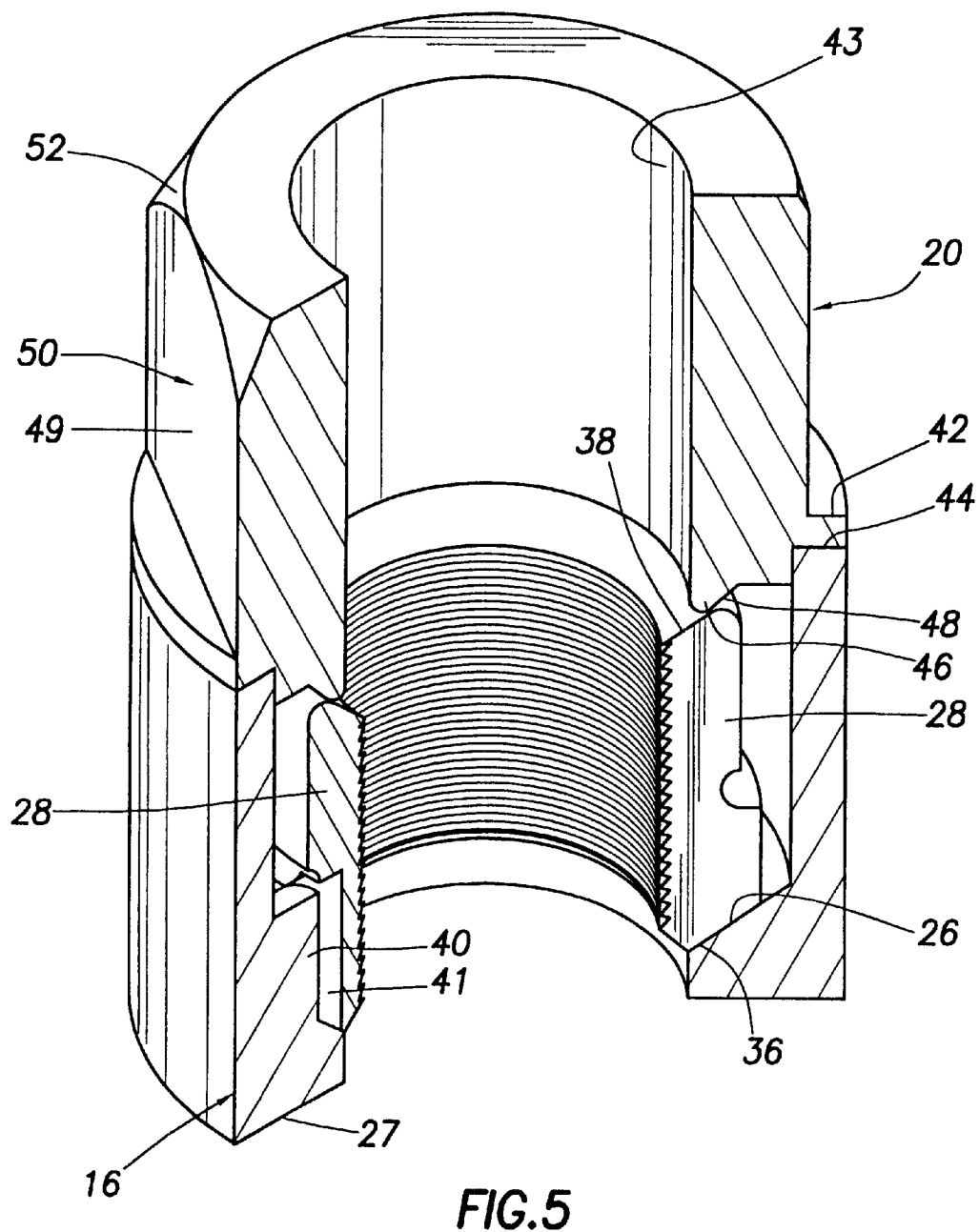
FIG. 5 is an enlarged fragmentary view showing the detent extending from the inner peripheral surface of the cylindrical casing and engaging an arcuate segment for rotation of the segment with the casing.

The nut assembly or coupling of the present invention is shown generally at 10 fitting about an externally threaded male member such as a bolt 12 having external screw threads 14. Nut assembly 10 is constructed and arranged for being pushed onto externally threaded bolt 12 or for bolt 12 to be pushed within nut assembly 10. Nut assembly 10 comprises a cylindrical body or casing 16 having a cap 20 secured thereto such as by welding. Cylindrical casing or body 16 has a central opening 22 defining an inner peripheral surface 24 and an inner frustoconical surface 26 adjacent the inner end of casing 14. Fitting within cylindrical casing 14 are three arcuate segments 28 having internal screw threads 30. A radial resilient spring 32 fits about segments 28 in grooves 34 to urge segments 28 together. Each arcuate segment 28 has an inner frustoconical surface 36 along its inner end and an outer frustoconical surface 38 along its outer end. Frustoconical surfaces 26 and 36 mate in a matching sliding relation to each other and extend at an angle A relative to the rotational axis. To restrain relative rotation between segments 28 and cylindrical casing 16, elongate detents or ribs 40 extend radially from inner peripheral surface 24 and fit in grooves 41 in segments 28. Detents 40 are integral with cylindrical casing 16 and are molded with casing 16 when casing 16 is formed of a moldable plastic material. Casing 16 has an inner end 27.

External screw threads 14 of arcuate segments 28 extend at an angle B relative to the rotational axis. Angle A is substantially greater than angle B to provide a firm connection between threads 30 on segments 38 and threads 14 on bolt 12 so that segments 28 do not tend to move rapidly radially upon pushing of nut assembly 10 onto bolt 12. Once segments 28 are seated with bolt 12, segments 28 cannot move radially or disengage bolt 12 since angle A is substantially greater than angle B.

Angle A for example may be about 40 degrees and angle B may be about 30 degrees. The variance between angle A and angle B prevents segments 28 from disengagement until a relative rotation of about 270 degrees in a reverse direction as provided between bolt 12 and nut assembly 10.

To retain arcuate segments 28 within cylindrical housing 16, cap 20 extends within cylindrical housing 16 and engages outer frustoconical surface 38. Cap 20 has a central opening 43 of a diameter sufficient to receive bolt 12. An outer annular flange 42 extends outwardly and may be welded to the annular upper end 44 of cylindrical casing 16 to secure cap 22 cylindrical casing 16. An annular lip 46 extends inwardly from the inner end of cap 20 and engages frustoconical surface 38 on the upper end of segment 28. Lip 46 defines a frustoconical surface 48 in engagement with frustoconical surface 38. Frustoconical surface 38 extends an angle C relative to the rotational axis and frustoconical surface 48 extends at an angle D relative to the rotational axis. Angle C is greater than angle D so that a relatively small contact area is provided between segments 28 and lip 46 thereby minimizing frictional contact and allowing segments 28 to move axially relative to bolt 12. Angle C is the same as angle A.

The outer peripheral surface of cap 20 includes six flats 49 to provide a hexagonal surface 50 for engagement with a conventional wrench for rotation of nut assembly 10. The outer edge of cap 20 is beveled at 52 to define a circular end surface for cap 20. Cylindrical body 16 is secured to cap 20 and detents 40 which form an integral part of cylindrical casing 16 engage arcuate segments 28 for rotation of segments 28 upon rotation of nut 20. The outer length or height L1 of nut 20 is at least ⅔ the length L2 of cylindrical casing 16. L1 may be between ¼ inch and 1¼ inches and L2 may be between ⅜ inch and 1¼ inches. Diameter D1 of cylindrical casing 16 may be between ⅜ inch and 1¼ inches. Thus, cylindrical casing 16 may fit within a very small circular opening as small as ⅜ inch.

Each bolt has a standard associated nut. For example, if the bolt has a diameter of ⅜ inch, the standard nut for the bolt has a ½ inch hexagonal shape between opposed flats which is the same as the wrench opening for the ⅜ inch bolt. Likewise, a push-on coupling for a ⅜ inch bolt would have a ½ inch hexagonal shape between flats to receive a wrench. Cap 20 is designed to have the same hexagonal shape as the standard nut and would have a ½ inch hexagonal shape between flats 49 as shown at H in FIG. 3 for a ⅜ inch bolt. Thus, the same torque equipment for a standard nut could be utilized for cap 20.

Operation

In operation for positioning of nut assembly 10 onto externally threaded bolt 12, nut assembly 10 is pushed over the extending end of externally threaded bolt 10 and segments 28 are expanded radially outwardly along frustoconical surface 26 as shown in FIG. 2 until nut assembly 10 is pushed to the desired position on bolt 12 against the bias of spring 32. Upon nut assembly 10 reaching the desired location, radial spring 32 urges segments 28 inwardly with threads 14 on nut 12 engaging threads 30 on segments 28. The end 27 of cylindrical casing 16 normally contacts an abutting surface for positioning of nut assembly 10. In this position, a wrench may be utilized to engage hexagonal surface 50 for tightening of nut assembly 10 onto bolt 12. For removal, a reverse rotation of nut assembly 10 from bolt 12 provides unthreading of nut assembly 10 from bolt 12 along threads 14 and 30.

Nut assembly 10 of the present invention is particularly adapted for fitting within small circular openings such as ⅜ inch in diameter. Since casing 16 is of an outer cylindrical shape, casing 16 is easily received within the opening which normally surrounds bolt 12. Outer cap 20 having an outer hexagonal surface 50 is provided for rotation of nut assembly 10 and is of a length L1 at least ⅔ the length L2 of cylindrical body 16 so that a sufficient length of nut 20 is provided for engagement by a suitable conventional wrench. Detents or ribs 40 are formed integrally with cylindrical casing 16 and project radially inwardly from the inner peripheral surface 24 of casing 16 for fitting in grooves 41 in the outer peripheral surface of segments 28 to provide rotation of segments 28 with cylindrical housing 16 and cap 20. Detents 40 are effective to transfer the rotational force from cap 20 to segments 28.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A nut assembly for fitting about an externally threaded male member and comprising:

an outer cylindrical casing having an opening therethrough and defining an inner cavity having an inner frustoconical surface adjacent one end of said cylindrical casing;

a plurality of internally threaded arcuate segments arranged in a circle for engaging in threaded relation the male member and having an inner frustoconical surface on an inner end thereof for radial sliding movement along said frustoconical surface of said cylindrical casing; and a cap fitting within the other end of said cylindrical casing and projecting a substantial distance from said cylindrical casing, said cap secured to said cylindrical casing and having a plurality of outer flats of sufficient length for engagement with a suitable wrench;

said cap having an inner annular lip projecting from an inner end of said cap for engaging an outer end of said segments, and having an outer circular flange about said inner end secured to the outer end of said cylindrical casing.

2. The nut assembly as defined in claim 1, wherein said outer end of said segments defines a frustoconical surface, and said inner lip has a frustoconical surface engaging said frustoconical surface of said segments.

3. The nut assembly as defined in claim 1, wherein said frustoconical surface of said cylindrical casing extends at an angle greater than the angle of the threads on the male member relative to the rotational axis.

4. The nut assembly as defined in claim 2, wherein said frustoconical surface on said outer ends of said segments extend at an angle greater that the angle of said frustoconical surface on said inner lip relative to the rotational axis.

5. The nut assembly as defined in claim 1, wherein the outer length of said cap is at least ⅔ of the outer length of said cylindrical casing.

6. A nut assembly for fitting about an externally threaded male member and comprising:

an outer cylindrical casing having an opening therethrough and defining an inner cavity having an inner frustoconical surface adjacent one end of said cylindrical casing;

a plurality of internally threaded arcuate segments arranged in a circle for engaging in threaded relation the male member and having an inner frustoconical surface on an inner end thereof for radial sliding movement along said frustoconical surface of said cylindrical casing; and a cap fitting within the other end of said cylindrical casing and projecting a substantial distance from said cylindrical casing, said cap secured to said cylindrical casing and having a plurality of outer flats of sufficient length for engagement with a suitable wrench;

said cap having a central opening therethrough of a diameter to receive the externally threaded male member, and having an inner annular lip projecting from an inner end of said cap for engaging an outer end of said segments.

7. The nut assembly as defined in claim 6, wherein the length of said cap is between ¼ inch and 1¼ inch, and the length of said casing is between ⅜ inch and 1¼ inches.

8. A nut assembly for fitting about an externally threaded male member and comprising:

an outer cylindrical casing having an opening therethrough and defining an inner cavity having an inner frustoconical surface adjacent one end of said cylindrical casing;

a plurality of internally threaded arcuate segments arranged in a circle for engaging in threaded relation the male member and having an inner frustoconical surface on an inner end thereof for radial sliding movement along said frustoconical surface of said cylindrical casing;

said arcuate segments having an outer frustoconical surface on an outer end thereof; and a cap having a central opening therethrough fitting within the other end of said cylindrical casing and having an inner annular lip projecting from an inner end of said cap defining a frustoconical surface for engaging said outer frustoconical surface on the outer end of said arcuate segments, said cap having an outer hexagonal surface and an outer annular flange adjacent the inner end of said hexagonal surface secured to the other end of said cylindrical casing;

said cylindrical casing having an inner peripheral surface and an integral inner detent projecting radially inwardly from said inner peripheral surface and engaging an arcuate segment for rotation of said segments with said cylindrical casing.

9. The nut assembly as defined in claim 8, wherein said frustoconical surface of said cylindrical casing extends at an angle greater than the angle of threads on said male member relative to the rotational axis.

10. The nut assembly as defined in claim 9, wherein said frustoconical surface on said outer ends of said segments extends at an angle greater that the angle of said frustoconical surface on said inner lip relative to the rotational axis.

11. The nut assembly as defined in claim 9, wherein the externally threaded male member is a bolt, and the outer hexagonal surface of said cap has opposed flats spaced from each other a distance equal to the distance between opposed flats on a standard nut size for said bolt.

12. The nut assembly as defined in claim 11, wherein said bolt has a diameter of ⅜ inch and said opposed flats on said cap are spaced from each other a distance of ½ inch.

13. A nut assembly for fitting about an externally threaded male member and comprising:

an outer cylindrical casing having an opening therethrough and defining an inner cavity having an inner frustoconical surface adjacent one end of said cylindrical casing;

a plurality of internally threaded arcuate segments arranged in a circle for engaging in threaded relation the male member and having an inner frustoconical surface on an inner end thereof for radial sliding movement along said frustoconical surface of said cylindrical casing; and a cap fitting within the other end of said cylindrical casing and projecting a substantial distance from said cylindrical casing, said cap secured to said cylindrical casing and having a plurality of outer flats of sufficient length for engagement with a suitable wrench;

said cap having an inner annular lip projecting from an inner end of said cap for engaging an outer end of said segments;

said cylindrical casing having an inner peripheral surface and an inner integral detent projecting radially inward from said inner peripheral surface and engaging an arcuate segment for rotation of said segments with said cylindrical casing.

\* \* \* \* \*